US008177646B2

(12) United States Patent
LeBaron

(10) Patent No.: US 8,177,646 B2
(45) Date of Patent: May 15, 2012

(54) SYSTEM AND METHOD FOR SECONDARY PROMOTION GAMING IN A GAMING SYSTEM

(75) Inventor: Richard G. LeBaron, Las Vegas, NV (US)

(73) Assignee: Aristocrat Technologies Australia Pty Limited (AU)

( * ) Notice: Subject to any disclaimer, the term of this patent is extended or adjusted under 35 U.S.C. 154(b) by 424 days.

(21) Appl. No.: 12/368,157

(22) Filed: Feb. 9, 2009

(65) Prior Publication Data

US 2009/0253501 A1 Oct. 8, 2009

Related U.S. Application Data

(60) Provisional application No. 61/026,957, filed on Feb. 7, 2008.

(51) Int. Cl.
*A63F 13/00* (2006.01)

(52) U.S. Cl. ................ 463/42; 463/29; 463/30; 463/31; 463/32

(58) Field of Classification Search ..................... 463/42
See application file for complete search history.

(56) References Cited

U.S. PATENT DOCUMENTS

| | | | | |
|---|---|---|---|---|
| 6,033,307 | A * | 3/2000 | Vancura | 463/20 |
| 6,126,541 | A * | 10/2000 | Fuchs | 463/13 |
| 6,364,768 | B1 * | 4/2002 | Acres et al. | 463/25 |
| 6,491,584 | B2 * | 12/2002 | Graham et al. | 463/25 |
| 6,575,829 | B2 * | 6/2003 | Coleman et al. | 463/20 |
| 6,702,670 | B2 * | 3/2004 | Jasper et al. | 463/20 |
| 7,118,479 | B2 * | 10/2006 | D'Amico et al. | 463/25 |
| 7,144,321 | B2 * | 12/2006 | Mayeroff | 463/16 |
| 7,322,887 | B2 * | 1/2008 | Belger et al. | 463/20 |
| 7,473,174 | B2 * | 1/2009 | Cuddy et al. | 463/20 |
| 7,597,619 | B2 * | 10/2009 | Crivelli et al. | 463/20 |
| 7,685,597 | B1 * | 3/2010 | Czajkowski et al. | 718/100 |

(Continued)

OTHER PUBLICATIONS

International Search Report and the Written Opinion corresponding to International Patent Application Serial No. PCT/US2009/033523.

(Continued)

*Primary Examiner* — Fernando L Toledo
*Assistant Examiner* — Ankush Singal
(74) *Attorney, Agent, or Firm* — McAndrews, Held & Malloy, Ltd.

(57) ABSTRACT

A system for playing a secondary game in a network of play devices having at least one display, and a processor for controlling a display to display at least one primary device feature. Each device receives serial inputs to operate discrete operational functions. The system includes a system server and a communication network to provide communications between each play device and the server. The server includes a data structure storing (i) account data for each player, (ii) data corresponding to a predetermined secondary game trigger, said trigger data corresponding to at least one of said serial inputs or primary device feature and (iii) data representing at least a schedule of winning secondary game outcomes and awards there for. At least one of said server and/or play devices is configured to (i) sense data related to said trigger to determine a correspondence with said trigger condition, (ii) control a display to display to the player a secondary game having first odds of obtaining at least one award, (iii) control said display to display said secondary game having greater second odds upon sensing data corresponding to a second trigger condition (iv) select and display at a display an outcome for said secondary game and (v) if the selected outcome corresponds to a winning secondary outcome, issue the corresponding award to the player.

4 Claims, 4 Drawing Sheets

U.S. PATENT DOCUMENTS

| | | | | |
|---|---|---|---|---|
| 7,722,458 | B2 * | 5/2010 | Walker et al. | 463/25 |
| 7,749,063 | B2 * | 7/2010 | Belger et al. | 463/16 |
| 7,775,874 | B2 * | 8/2010 | Ching et al. | 463/20 |
| 7,867,077 | B2 * | 1/2011 | Baerlocher et al. | 463/20 |
| 7,927,206 | B2 * | 4/2011 | Baerlocher et al. | 463/20 |
| 2002/0086725 | A1 * | 7/2002 | Fasbender et al. | 463/11 |
| 2003/0060266 | A1 | 3/2003 | Baerlocher | |
| 2003/0104855 | A1 * | 6/2003 | McClintic | 463/16 |
| 2004/0033830 | A1 * | 2/2004 | Gold et al. | 463/20 |
| 2004/0266517 | A1 * | 12/2004 | Bleich et al. | 463/20 |
| 2005/0054429 | A1 * | 3/2005 | Baerlocher et al. | 463/25 |
| 2006/0025199 | A1 * | 2/2006 | Harkins et al. | 463/19 |
| 2006/0068885 | A1 * | 3/2006 | Cregan et al. | 463/20 |
| 2006/0079313 | A1 * | 4/2006 | Trainor et al. | 463/20 |
| 2006/0178199 | A1 * | 8/2006 | Thomas | 463/20 |
| 2006/0205491 | A1 | 9/2006 | Daley | |
| 2006/0223615 | A1 * | 10/2006 | Englman | 463/17 |
| 2007/0015566 | A1 * | 1/2007 | Baerlocher et al. | 463/20 |
| 2007/0149267 | A1 * | 6/2007 | Ross et al. | 463/13 |
| 2007/0155463 | A1 * | 7/2007 | Ghaly | 463/16 |
| 2007/0167201 | A1 * | 7/2007 | Schultz | 463/1 |
| 2007/0225066 | A1 * | 9/2007 | Duhamel | 463/25 |
| 2007/0232390 | A1 * | 10/2007 | Sato | 463/25 |
| 2007/0243934 | A1 * | 10/2007 | Little et al. | 463/40 |
| 2007/0298857 | A1 * | 12/2007 | Schlottmann et al. | 463/16 |
| 2008/0026832 | A1 * | 1/2008 | Stevens et al. | 463/26 |
| 2008/0099987 | A1 * | 5/2008 | Schultz | 273/138.1 |
| 2008/0102927 | A1 * | 5/2008 | Mayeroff | 463/20 |
| 2008/0102934 | A1 * | 5/2008 | Tan | 463/25 |
| 2008/0108411 | A1 * | 5/2008 | Jensen et al. | 463/20 |
| 2008/0108431 | A1 * | 5/2008 | Cuddy et al. | 463/27 |
| 2008/0182650 | A1 * | 7/2008 | Randall et al. | 463/25 |
| 2009/0104954 | A1 * | 4/2009 | Weber et al. | 463/1 |
| 2009/0111566 | A1 * | 4/2009 | Naicker et al. | 463/20 |
| 2009/0197672 | A1 * | 8/2009 | Kelly et al. | 463/25 |

OTHER PUBLICATIONS

Patent Cooperation Treaty, Notification Concerning Transmittal of International Preliminary Report on Patentability, in PCT/US2009/033523, dated Aug. 19, 2010.

* cited by examiner

SYSTEM AND METHOD FOR SECONDARY PROMOTION GAMING IN A GAMING SYSTEM

RELATED APPLICATIONS

This application claims priority to U.S. Provisional Patent Application No. 61/026,957, having a filing date of Feb. 7, 2008, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

The present invention relates to systems and methods for providing a system operated promotional or secondary game to player using electronic devices such as playing gaming machines.

BACKGROUND OF THE INVENTION

Modern casinos provide players with up to several thousand gaming machines, often, called "slot machines" to play for fun and enjoyment. These slot machines are typically connected to slot accounting and player system(s) which monitor the play of the machines for regulatory, accounting and performance purposes. Aside from the regulatory and accounting requirements, the player trading system provides a mechanism where player's activity can be tracked for purposes of marketing and providing the players with "comps", e.g. promotions. These promotions offered to player by, for example, cash back, free rooms, meals, show tickets and the like server to drive loyalty between the casino and its players. Successful promotional programs can drive increased business and casino play and resulting revenues. Casinos often compete against one another for players using promotions.

Modern slot machines have one or more electronic displays such as CRT, plasma, LCD or other types of displays. It has been known to provide two displays on a slot machine—one for the display of the game content and its features and the other display dedicated to player tracking, advertising, promotional and related information. It is also known to provide one or more displays with "picture-in-picture" capability to display game content and player tracking or other information, such as live video of a sports event, on one or more displays. Suffice it to say, the player tracking system interfaces with a display at the slot machine to inform the player and provide apparatus for the player to interact with the system. This interaction may be to download value credits to the slot machine for play, as described in U.S. Pat. No. 7,217,190 titled "Cashless Gaming System Apparatus and Method" and issued May 15, 2007 to Aristocrat Technologies, Inc. (the disclosure of which is incorporated by reference) or to download promotional credits for play and the slot machine. Typically promotional credits cannot be cashed out for value but instead must be played in the slot machine.

Player tracking systems operate by issuing a tracking instrument to players such as a machine readable card. These cards can have a machine readable bar code or can be a smart card. When the card is issued to the player, identification information is taken from the player and a player account is established at the player tracking database. When a player plays a machine, they insert their card with a card reader at the machine. The reader provides an interface with the player tracking system and opens the player's account. As the player makes wagers to play the machine the system tracks information such as time, date, coin-in (amount wagered), jackpots paid (amount paid out to the player) and so forth. Based upon the player's play, such as coin-in, the player is awarded "comp points" which, depending upon the parameters of the player loyalty program can be redeemed for promotional credits, cash, merchandise and services.

It has been known to provide a system driven secondary game though the player tracking interface. In this secondary game the system, at certain intervals and to players meeting eligibility requirements including at least having their loyalty card read at the gaming machine, issues a Bingo card to the player and initiates a system wide bingo game. At the player tracking interface the player's card is displayed and any matches are marked and depending upon the number of matches, the player wins a prize.

For slot machines it has also been known to provide a secondary game. For example in U.S. Pat. No. 7,000,921 titled "System and Method for Playing a Bonus Game" issued Feb. 21, 2006 to Bally Gaming" (the disclosure of which is incorporated by reference) discloses a game where, based upon a trigger event such as symbol combinations in a base game, time of day or detection of a particular player, a bonus game is provided. The bonus game provides cards from an abridged deck of playing cards and the player can discard and draw to make a final hand. The final hand is then evaluated against a pay table to determine if the payer is entitled to an award.

In addition to slot machines, secondary or promotional games can also be employed with other electronic devices such as cellular telephones, PDAs or other such devices. These secondary games may offer chances at promotions based upon operation of the device to encourage use of the device and promote loyalty with, for example, the cellular service provider.

There is a need for a system based promotional game which provides users or players with a degree of strategy and control in reaching a winning or losing outcome.

There is a need for a secondary promotional game where continued usage or play can increase the player's chances of producing a winning outcome.

BRIEF SUMMARY OF THE INVENTION

In one embodiment, the invention provides a system for playing a secondary game in a network of play devices of the type having at least one display, a processor for controlling a display to display at least one primary device feature, each device receiving serial inputs to operate discrete operational functions. The system includes a system server including a data structure storing (i) account data for each player, (ii) data corresponding to a predetermined secondary game trigger, said trigger data corresponding to at least one of said serial inputs or primary device feature and (iii) data representing at least and a schedule of winning secondary game outcomes and awards therefor. The system also includes a communication network to provide communications between each play device and the server, at least one of said server and/or play devices configured to (i) sense data related to said trigger to determine a correspondence with said trigger condition, (ii) control a display to display to the player a secondary game having first odds of obtaining at least one award, (iii) control said display to display said secondary game having greater second odds upon sensing data corresponding to a second trigger condition (iv) select and display at a display an outcome for said secondary game and (v) if the selected outcome corresponds to a winning secondary outcome, issue the corresponding award to the player.

In another embodiment, the invention provides a method for playing a secondary game in a network of play devices of the type having at least one display, a processor for controlling a display to display at least one primary device feature, each device receiving serial inputs to operate discrete operational functions. The method includes storing at a system server (i) account data for each player, (ii) data corresponding to a predetermined secondary game trigger, said trigger data corresponding to at least one of said serial inputs or primary device feature and (iii) data representing at least a schedule of winning secondary game outcomes and awards there for. The method also includes each play device communicating with the server, and configuring at least one of said server and/or play devices to (i) sense data related to said trigger to determine a correspondence with said trigger condition, (ii) control a display to display to the player a secondary game having first odds of obtaining at least one award, (iii) control said display to display said secondary game having greater second odds upon sensing data corresponding to a second trigger condition (iv) select and display at a display an outcome for said secondary game and (v) issue an award if the selected outcome corresponds to a winning secondary outcome.

BRIEF DESCRIPTION OF SEVERAL VIEWS OF THE DRAWINGS

These and other features, aspects and advantages of the present invention will become better understood when the following detailed description is read with reference to the accompanying drawings in which like characters represent like part throughout the drawings. The embodiments shown in the drawings are presented for purposes of illustration only. It should be understood, however, that the present invention is not limited to the arrangements and instrumentality shown in the attached drawings.

DETAILED DESCRIPTION OF THE INVENTION

Figure 1:
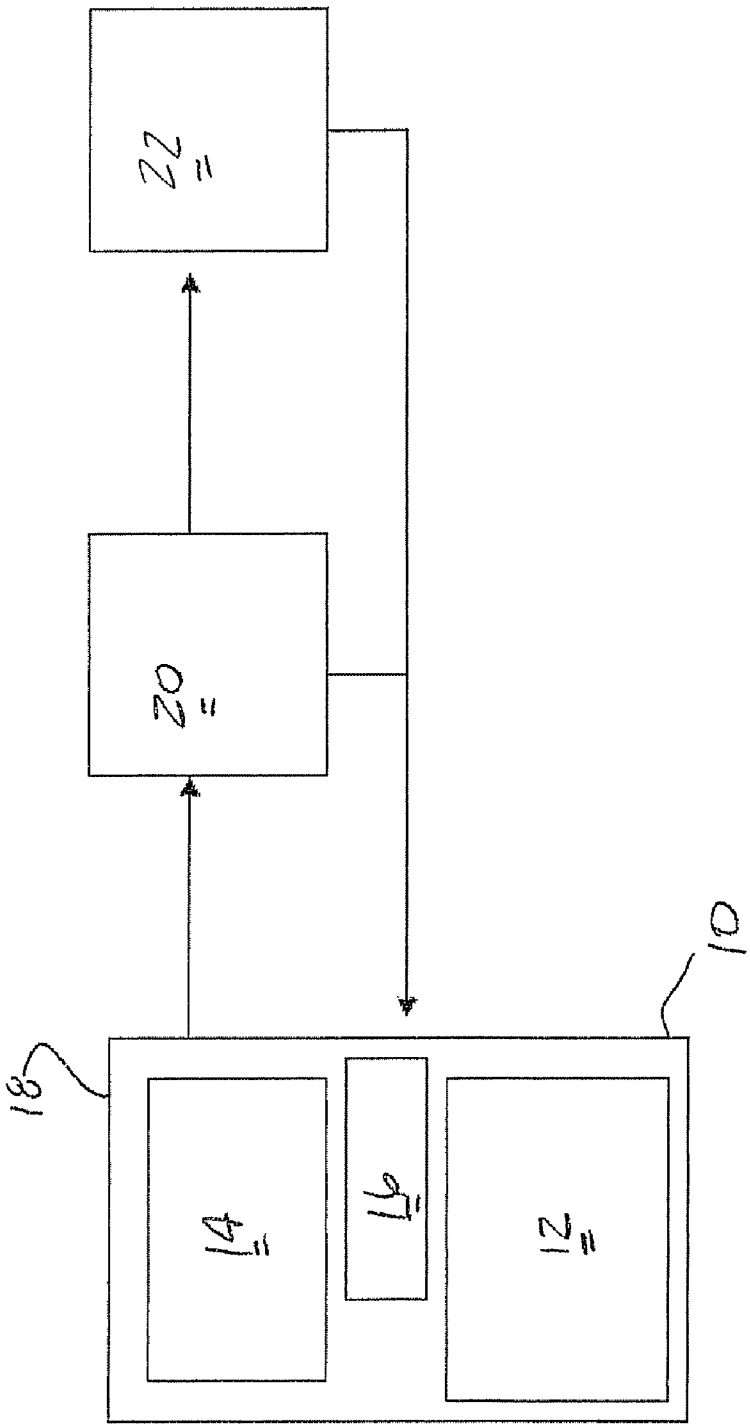
FIG. 1 illustrates a gaming system and method providing a secondary promotional game.

Tuning to the drawings FIG. 1 shows a diagram of the system and method for providing a secondary promotional game. A gaming machine 10 has one or more video displays shown and a game display 12, top box display 14 and player tracking module (PTM) display 16. In a typical casino environment for the present invention there would be several hundreds gaining machines 10 having the one or more displays 12, 14, 16 described and shown. The gaming machine 10 includes an outer cabinet 18 which houses the gaming machine processor, memory and the like as is known in the art. The gaming machine 10 also has a game interface (not shown) such as buttons or a touch screen interface at the game display 12.

The gaming machine is configured to provide the player with a base game as is known in the art. The base game can be video Poker, Keno, a video slot machine presentation, a stepper-type electro mechanical slot machine presentation, video Blackjack or the like. The nature of the base game provided at the gaming machine 10 is not crucial to the method and system of the present invention. To play the base game, as is known in the art, the player enters a wager and prompts play. The gaming machine 10 presents either a partial outcome such as an initial holding for a hand of video Poker or a winning or losing outcome such as a result of a spin of the slot machine reels. For video Poker, the player interacts through the player game interface by holding a drawing replacement cards to produce a final winning or losing Poker hand outcome.

The base game is typically presented at the game display 12. The base game may also present bonus games, as is known in the art, at one or both of the game display 12 or top box display 14. For purposes of this application, the base game and bonus game(s), unless otherwise indicated, will be collectively described as the base game.

The gaming machine 10 has a player tracking interface which includes the PTM display 16. The interface and PTM display 16 may be a described in U.S. Pat. No. 7,217,190 titled "Cashless Gaming System Apparatus and Method" and issued May 15, 2007 to Aristocrat Technologies, Inc. (the disclosure of which is incorporated by reference). This interface includes a reader (not shown) configured to read a player tracking (loyalty) card and to interface with a player tracking system as is known in the art. U.S. Pat. No. 5,655,961 titled "Method for Operating Networked Gaming Systems" issued Aug. 12, 1997 to Acres Gaming, Inc., the disclosure of which is incorporated by reference, discloses player tracking systems and the interface. When a player enrolls in the loyalty program the casino establishes an electronic account which contains player specific information and will represent the repository for player loyalty points accumulated based upon the play of the player. When the player plays a gaming machine 10, they insert their card in the card reader which opens or enables communication with the player tracking system so he player's wagers at the gaming machine 10 can be accumulated as "points". These "points", depending upon the rules of the loyalty program, can be redeemed for cash, merchandise, services, promotional credits (which can only be used for wagering or for re-bating of wagering at the gaming machine 10) or other complementary incentives.

The gaming machine 10, also as is known in the art, interfaces with a slot accounting system. Data such as wagers, pay outs, jackpots or maintenance or security events are transmitted to the slot accounting system. This data is used for regulatory and business purposes as well as providing data used by the player trading system, e.g. tracking wagers.

Returning to FIG. 1, the gaming machine 10 communicates with a controller 20 which is configured to detect a promotional game trigger condition. The controller 20 may be a software module at the player tracking or slot accounting system or may be a separate controller. The controller 20 interfaces with a secondary game server 22. The secondary game server 22 is in communication with a display 12, 14 or 16 at the gaming machine. Where the secondary game of the present invention is to be played at the game display 12, the base game may be interrupted and the entire base game display 12 commandeered or a portion of the base game display 12 used for the secondary game. Alternatively or additionally the secondary game may be displayed at the top box display 14 or the PTM display 16. Inasmuch as the PTM display 16 preferably includes touch screen functionality, the PTM display 16 is a preferred venue for display of and interaction with the secondary game.

Figure 2:
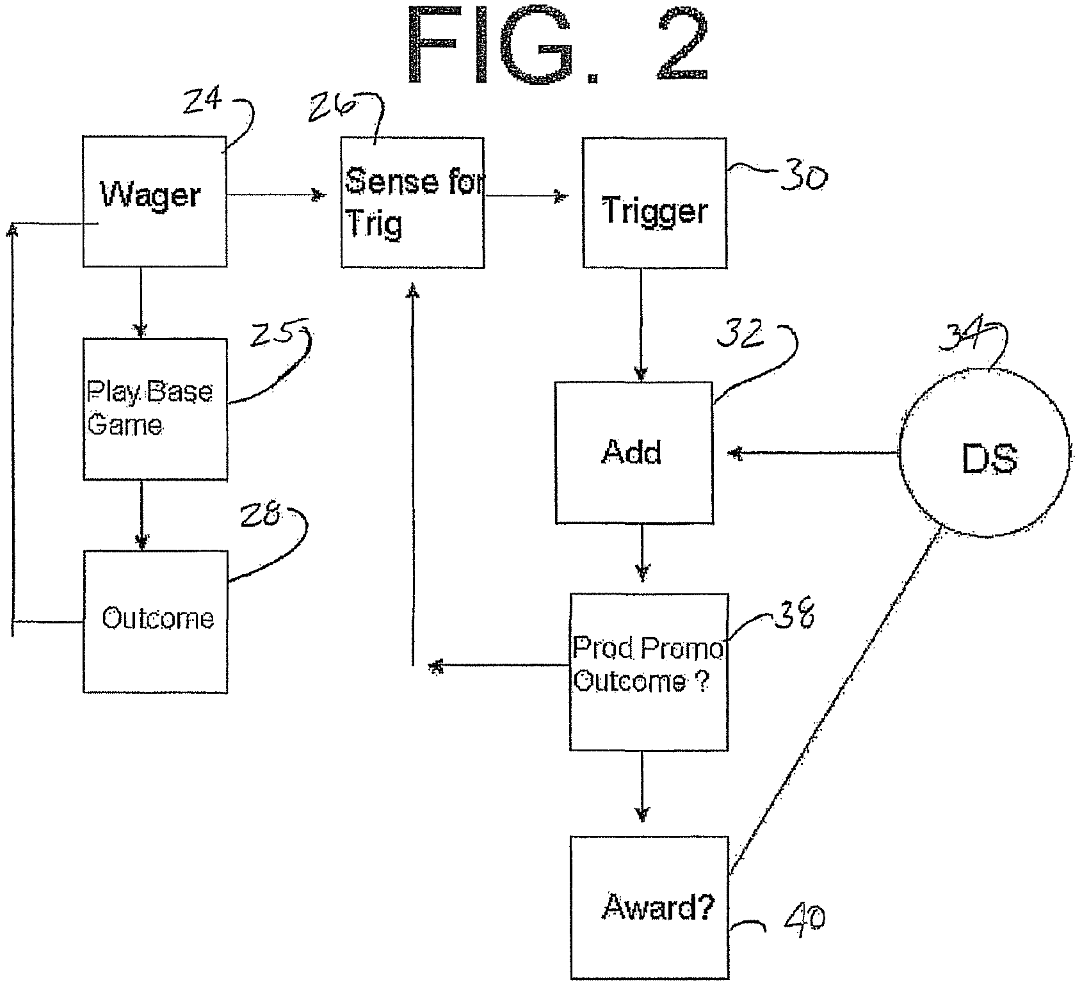
FIG. 2 illustrates a flow diagram for a system and method for providing a secondary promotional game.

With reference to FIG. 2 a flow diagram is shown to illustrate an embodiment of the method of the present invention. At 24 the player makes a wager to play the base game. Prior to making the wager the player has opened up the interface with the player tracking system by inserting their player tracking card in the card reader. At 25 the player plays the base game to produce a base game winning or losing outcome at 28. If the player obtains a winning base game outcome they are paid an award according to the rules and pay table for the base game. At 26 the controller 20 tests to determine if a predetermined secondary game trigger condition has been met. This trigger condition may be one or more of (1) reading a valid player tracking card, (2) player coin-in (cumulative amount wagered) over a predetermined time T, (3) obtaining one or more outcomes at the base game, (4) the system recognizing the player upon reading of the player tracking card, (5) consecutive losses at the base game, (6) consecutive wins at the base game, (6) a particular outcome from a bonus game, (7) time or day, (8) reading of a coupon at the gaming machine 10, (9) a trigger input by the casino operator or the like. If the predetermined trigger condition at 30 trigger the secondary game of the present invention is met, in either initiated in a first instance or re-initiated at 32, the secondary game is invoked.

Figure 3:
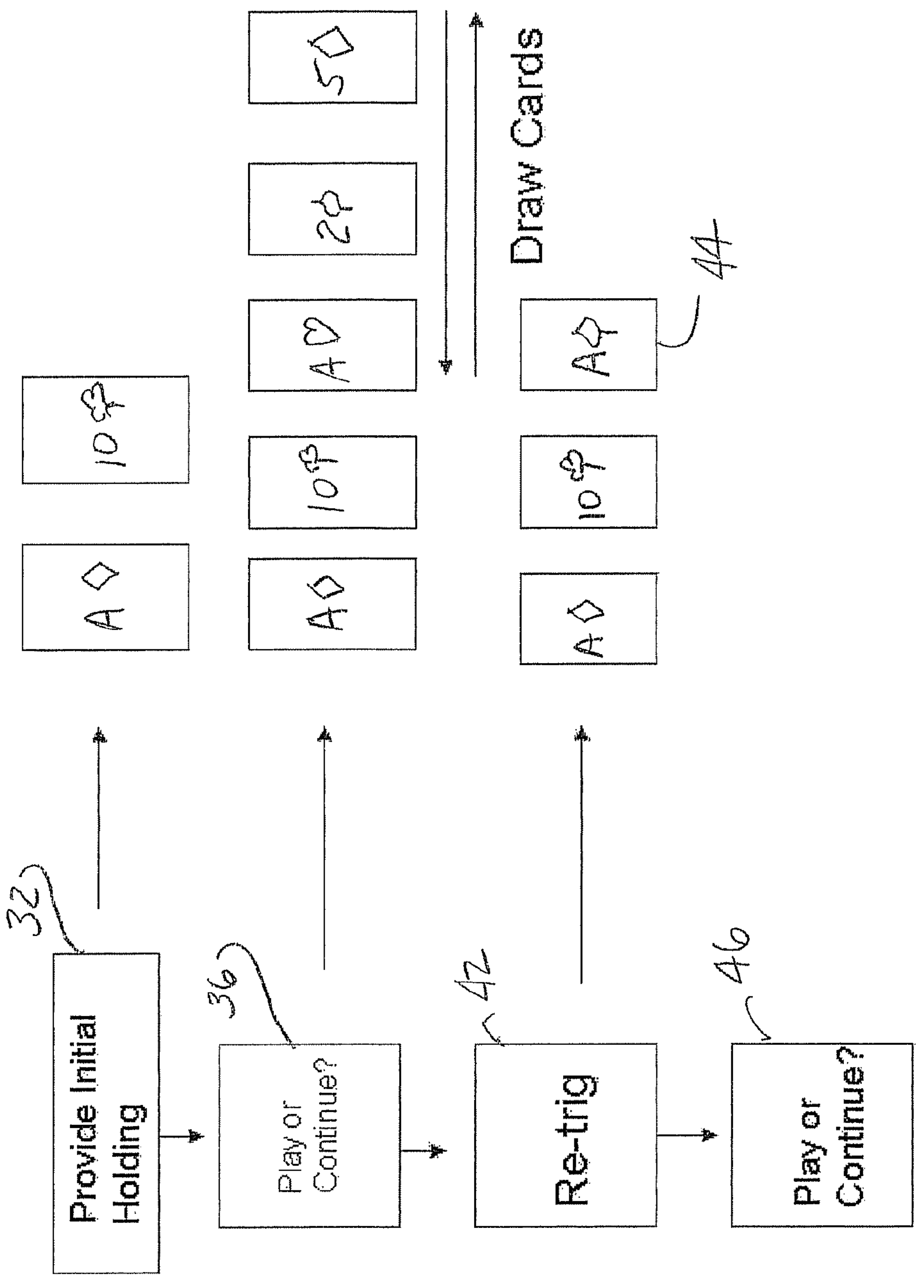
FIG. 3 illustrates a gaming system and method for providing a secondary card game.

FIGS. 2 and 3 provide an example of a secondary game embodied as a card game. Upon the player initially triggering the secondary game, such as by having wagered the predetermined amount over a time T, the secondary game server 22 (FIG. 1) at 32 provides an initial holding of, for example, two playing cards randomly selected from a data structure 34 holding in memory data representing a deck of playing cards. For example, the cards may be A♦ 10♣. A tone, message or interruption of the base game may take place to inform the player of initiation of the secondary game. At 36 the player can opt to play the secondary game now or continue play to a later time to enhance their chances of getting a winning outcome. If the player elects to play, the player would respond by so electing and the secondary game server 22 would select and display three more playing cards to produce a five card Poker hand. For example, the secondary game server 22 may randomly select from the data structure 34 A♥ 2♠ 5♦ resulting in a hand of a pair of Aces. This secondary game outcome is evaluated at 38 and if the outcome is entitled to an award the player would be awarded, for example, a pay out of promotional points, e.g. 100 loyalty points, for the outcome at 40. If the outcome is a losing outcome the player would be awarded 0 loyalty points or preferably a consolation prize of, for example, 20 loyalty points.

According to the present invention, the player has the ability to increase their chances or opportunities to receive a winning secondary game outcome by "building" toward one or more outcomes. For example, if at 36 the player, upon the initial trigger, elected to continue with the secondary game, the initial holding of A♦ 10♣ would be banked in the player's account and the player would continue to play the base game. The player can move to another gaining machine 10 and his position in the secondary game is saved since the initial holding is banked at the player's account. Continuing to play the base game the player re-triggers the secondary game at 42 resulting in the secondary game server 22 randomly selecting from the data structure 34 an additional card 44 shown as an A♠. The player at 46 now has the opportunity or playing the game or continuing. Should the player elect to play, the system server 22 would randomly select and display three cards (for example the same three in the previous example of A♥ 2♠5♦) now giving the player three Aces for a higher award. The player could elect to continue for, for example, up to five cards which, with the three draw cards, would give the player eight cards to make a five card Poker hand thereby increasing their chances of making a high paying Poker hand. As can be appreciated, by electing to continue to play the player can build toward an outcome and increase their chances of receiving a winning secondary game award. This also encourages players to continue playing as they build toward an outcome.

The time period over which a player can build toward an outcome may be configured to encourage play while providing the promotion. For example, the player may be able to "bank" what they have been building over a three day period before they must elect to complete the secondary game or before the secondary game server does it automatically for them. For example, if the player has banked three cards based upon obtaining secondary game triggers but discontinues play during the predetermined time period, the system would, at the end of the time period, automatically draw the three draw cards and evaluate the outcome and issue any award into the player's account.

The card game version is subject to several modifications. For example, upon achieving a trigger the player may discard and replace one or more cards in the holding to complete a five card hand or cards toward the five card holding.

Figure 4:
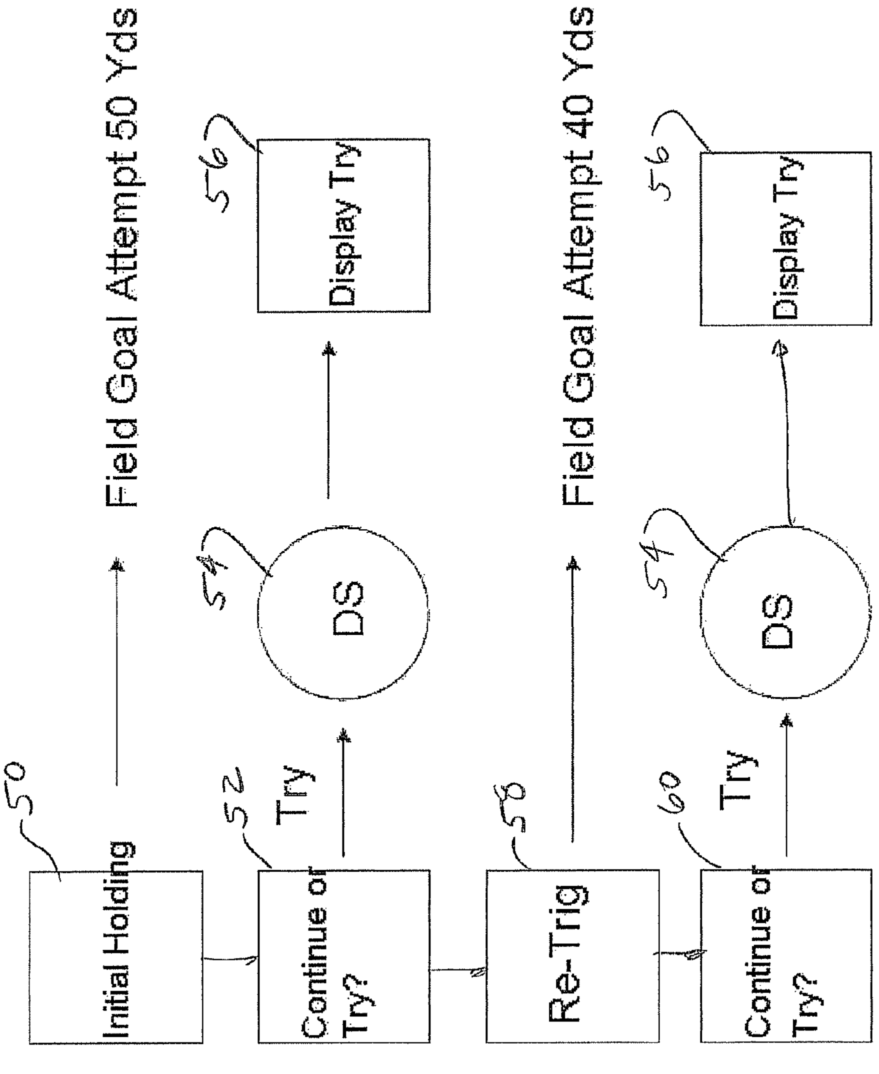
FIG. 4 illustrates a gaming system and method for providing a secondary promotional game in the form of a football game.

As another example of the method and system of the present invention, the secondary game may be embodied as a sports themed game such as football. With reference to FIG. 4, upon the player meeting the trigger condition, an initial holding 50 is presenting to the player such as a field goal attempt of 50 yards. The player may have the opportunity to complete the secondary game. At 52 the player elects to continue with the secondary game or try the field goal. If the player elects to try, the secondary game is played to completion. The secondary game server 22 randomly selects an outcome such as a weighted table stored in data structure 54 for attempts of 50 yards giving the player, for example, a 1:10 chance of a winning field goal. The result at 56 is displayed at the PTM display 16 or game display 12 or top box display 14 as animated or actual footage of a field goal attempt of 50 yards. If the player makes the field goal they are issued a promotional award such as points or other comps (meal, merchandise, etc.).

If the player elects to continue, he plays the base game until at 58 the game is re-triggered which then presents the player with the proposition of attempting a field goal of 40 yards. At 60 the player elects to try, the secondary game is played to completion. The secondary game server 22 randomly selects an outcome such as a weighted table stored in data structure 54 for attempts of 40 yards giving the player, for example, a 1:7 chance of a winning field goal, which is a better chance that the player had from 50 yards. The result at 56 is displayed at the PTM display 16 or game display 12 or top box display 14 as animated or actual footage of a field goal attempt from 40 yards. If the player makes the field goal they are issued a promotional award such as points, free plays or other comps (meal, merchandise, etc.).

As can be appreciated the more the player plays during the relevant time for the secondary game he can, by re-triggering, increase his chances for receiving a winning outcome.

Other examples of the secondary game would be a fishing theme where the more the player plays the more fishing lines the player has in the water or the more (and bigger) fish and prizes that are presented. Another theme may be the more the player plays the more selections the player has from a prize pool. For example, at the first trigger the player may be offered to select from a displayed set of wrapped presents from a pool including large and small awards. The more the player plays the more presents are displayed increasing the likelihood of the player selecting a large prize. The game could also be a Keno or Bingo game where upon each re-trigger the player receives another Keno or Bingo card. For example, on the first trigger the secondary game would award a single Keno card with six numbers randomly selected. Upon the re-trigger another card with six numbers randomly selected would be awarded to the player. At any time after the first trigger the player can elect to have the Keno draw. Otherwise the player could accumulate Keno cards until the end of the secondary game time period at which time the award of any additional cards would be frozen and the Keno draw would occur.

It should be noted prior to the expiration of the secondary game time period, if the player elects to complete the game, the player receives a secondary game outcome and an award. The player can then start another play of the secondary game. When the game is triggered the player receives another play. Thus the player can elect to build toward outcomes or receive multiples outcomes during the secondary game time period.

The secondary game time period may be several hours, days or weeks. Further, the player's plays are stored at the player's account. The player may discontinue play and move to different slot machines and continue to play toward triggers and build toward an outcome. The secondary game may time out for a player when they have received X triggers. The prize awarded from the promotional game can be player points, merchandise, services, cash, free plays of the base game and promotional credits which can only be used for wagering or the like. The award schedule could be akin to a video Poker pay schedule, preferably with a small consolation prize so the player gets something, for a Poker embodiment. For other embodiments weighted pay tables could be used to increase the excitement and expectation of a high award. As but an example for the football field goal embodiment, the play table for the secondary game may be configured as below. Other pay tables could be used as well to provide the player with awards from the secondary game and to encourage play.

| Distance | Awards | Probability (in %) |
|---|---|---|
| 50 Yards | 100 Points | Consolation Prize (60%) |
| | 200 Points | 20% |
| | 500 Points | 15% |
| | 1000 Points | 5% |
| 40 Yards | 200 Points | Consolation Prize (50%) |
| | 500 Points | 30% |
| | 1000 Points | 15% |
| | 1500 Points | 5% |
| 30 Yards | 500 Points | Consolation Prize (40%) |
| | 1000 Points | 30% |
| | 1500 Points | 15% |
| | 2000 Points | 15% |

The player's chances and awards increase where the player continues play by seeking re-triggers.

It should further be noted that the system and method of the present invention could be employed in mobile gaming environments such as in cell phones, PDAs or the like, where and in a manner permitted by regulation. For example, where mobile gaming is not permitted the system and method could be played for promotional credits such as cell phone minutes, virtual credits or the like. Further, for example, a cell phone environment, the base functionality which in a gaming environment is the base game, may, in a non-gaming environment be the use of cell phone minutes. As the person uses the cell phone the number of minutes used may accumulate to a trigger value to launch the secondary game feature in the manner described above. In such an instance rather than a primary game, the cell phone device operates to display device features (such as menus, number called, incoming call, etc.). Rather than receiving a wager the system/device has serial inputs such as calls made, received or made and received.

Still further, the theme and nature of the secondary game may be selectable by the player or may be selected by the operator consistent with holidays, time of year, special promotions or the like.

The invention claimed is:

1. A system for playing a secondary game in a network of play devices of the type having at least one display, a processor for controlling a display to display at least one primary device feature, each device receiving serial inputs to operate discrete operational functions, said system comprising:

a system server including a data structure storing (i) account data for each player, (ii) trigger data corresponding to a predetermined secondary game trigger, said trigger data corresponding to at least one of said serial inputs and (iii) data representing at least a schedule of winning secondary game outcomes and awards there for;

a communication network to provide communications between each play device and the server;

at least one of said server and/or play devices configured to (i) sense a first trigger condition, (ii) control a display to display to the player a secondary game having first odds of obtaining at least one award, wherein the secondary game having first odds comprises the server randomly selecting a first number of symbols and randomly selecting a second number of symbols, (iii) control said display to display a said secondary game having greater second odds upon sensing data corresponding to a second trigger condition, wherein the secondary game having greater second odds comprises the server selecting a third number of symbols that is greater than the first number of symbols and selecting the second number of symbols, (iv) select and display at a display an outcome for said secondary game and (v) if the selected outcome corresponds to a winning secondary outcome, issue the corresponding award to the player, wherein the selected outcome is based on either the first number of symbols and the second number of symbols for the secondary game having first odds, or the third number of symbols and the second number of symbols for the secondary game having greater second odds.

2. The system of claim 1 comprising said play devices are gaming devices, said processor controlling the display to display a primary device feature of a game, said system server including a data structure storing data corresponding to a secondary game trigger related to the amounts wagered for serial play the game.

3. A method for playing a secondary game in a network of play devices of the type having at least one display, a processor for controlling a display to display at least one primary device feature, each device receiving serial inputs to operate discrete operational functions, said method comprising:

storing at a system server (i) account data for each player, (ii) trigger data corresponding to a predetermined secondary game trigger, said trigger data corresponding to at least one of said serial inputs and (iii) data representing at least a schedule of winning secondary game outcomes and awards there for;

each play device communicating with the server; configuring at least one of said server and/or play devices to (i) sense a first trigger condition, (ii) control a display to display to the player a secondary game having first odds of obtaining at least one award, wherein the secondary game having first odds comprises the server randomly selecting a first number of symbols and randomly selecting a second number of symbols, (iii) control said display to display a said secondary game having greater second odds upon sensing data corresponding to a second trigger condition, wherein the secondary game having greater second odds comprises the server selecting a third number of symbols that is greater than the first number of symbols and selecting the second number of symbols., (iv) select and display at a display an outcome for said secondary game and (v) issue an award if the selected outcome corresponds to a winning secondary outcome, wherein the selected outcome is based on either the first number of symbols and the second number of symbols for the secondary game having first odds, or the third number of symbols and the second number of symbols for the secondary game having greater second odds.

4. The method of claim 3 comprising said play devices are gaming devices, said processor controlling the display to display a primary device feature of a game, said method comprising storing at said system server data corresponding to a secondary game trigger related to the amounts wagered for serial play the game.

* * * * *